US008783693B2

(12) United States Patent
Beele

(10) Patent No.: US 8,783,693 B2
(45) Date of Patent: *Jul. 22, 2014

(54) METHOD AND SEALING SYSTEM FOR SEALING AN ANNULAR SPACE BETWEEN A RIGID CONDUIT AND A PIPE, TUBE OR DUCT EXTENDING THROUGH THE CONDUIT AND MADE OF A THERMALLY WEAKENABLE MATERIAL

(75) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 1157 days.

This patent is subject to a terminal disclaimer.

(21) Appl. No.: 12/663,754

(22) PCT Filed: Jun. 20, 2008

(86) PCT No.: PCT/EP2008/057894
§ 371 (c)(1),
(2), (4) Date: Oct. 5, 2010

(87) PCT Pub. No.: WO2009/000778
PCT Pub. Date: Dec. 31, 2008

(65) Prior Publication Data
US 2011/0018206 A1  Jan. 27, 2011

(30) Foreign Application Priority Data
Jun. 22, 2007 (GB) .................................. 0712271.6

(51) Int. Cl.
*F16L 5/02* (2006.01)
*H02G 3/22* (2006.01)
*F16L 21/05* (2006.01)
*F16L 17/00* (2006.01)
*F16L 21/02* (2006.01)
*F16L 33/16* (2006.01)
*H02G 15/013* (2006.01)
*E04B 1/682* (2006.01)

(52) U.S. Cl.
USPC ............ 277/606; 277/314; 277/316; 277/603

(58) Field of Classification Search
USPC .......... 277/312.314, 316, 603, 606–609, 616, 277/627
See application file for complete search history.

(56) References Cited

U.S. PATENT DOCUMENTS 4,901,488 A * 2/1990 Murota et al. ................... 52/232
5,344,106 A * 9/1994 Beele ............................... 248/56
5,744,199 A * 4/1998 Joffre et al. .................... 427/387

(Continued)

FOREIGN PATENT DOCUMENTS

| EP | 1703189 | 9/2006 |
| EP | 1703189 A1 * | 9/2006 |
| JP | 05-0228223 | 9/1993 |
| WO | WO 02/052187 | 7/2002 |

*Primary Examiner* — Vishal Patel
*Assistant Examiner* — Nicholas L Foster
(74) *Attorney, Agent, or Firm* — Wolf, Greenfield & Sacks, P.C.

(57) ABSTRACT

Method for sealing an annular space in a rigid conduit (2) and a pipe, tube or duct (3) extending through the conduit (2) and made of a thermally weakenable material, wherein the method comprises applying in the conduit a layer (4) of a thermally expandable material concentrically around the pipe, tube or duct (3), and applying at each end of the conduit (2) between the conduit and the pipe, tube or duct (3) a sealant (5) being made of a fire resistant polymer.

24 Claims, 8 Drawing Sheets

(56) References Cited

U.S. PATENT DOCUMENTS

Figure 1:
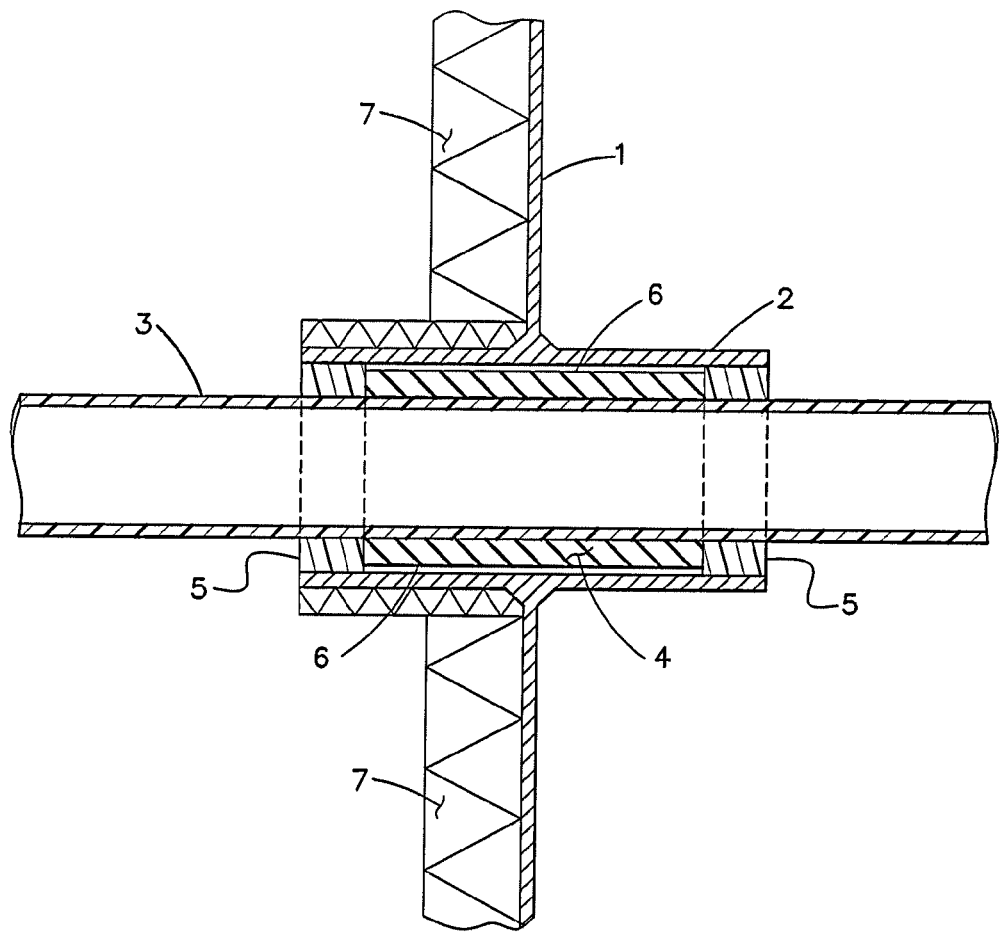

| | | | |
|---|---|---|---|
| 6,674,012 B2 * | 1/2004 | Beele | 174/140 R |
| 6,777,616 B2 * | 8/2004 | Beele | 174/650 |
| 6,862,852 B1 * | 3/2005 | Beele | 52/220.8 |
| 7,071,411 B2 * | 7/2006 | Beele | 174/659 |
| 2001/0001355 A1 | 5/2001 | Shimizu | |

* cited by examiner

METHOD AND SEALING SYSTEM FOR SEALING AN ANNULAR SPACE BETWEEN A RIGID CONDUIT AND A PIPE, TUBE OR DUCT EXTENDING THROUGH THE CONDUIT AND MADE OF A THERMALLY WEAKENABLE MATERIAL

INTRODUCTION

The invention is related to a method for sealing an annular space between a rigid conduit and a pipe, tube or duct extending through the conduit and made of a thermally weakenable material. The invention is further related to a sealing system for sealing an annular space between a rigid conduit and a pipe, tube or duct extending through the conduit and of a thermally weakenable material. The invention is further related to a partition provided with a rigid conduit and a pipe, tube or duct of a thermally weakenable material extending through the conduit.

BACKGROUND OF THE INVENTION

Conduits are normally incorporated in a construction element that divides, for instance, two departments. Such a construction element may also be referred to as a partition. A pipe may extend through the conduit from one of the two compartments into the other. These conduits are often referred to as pipe penetrations or transit systems. Such a conduit is often present in constructions formed on the basis of civil engineering. Factories, buildings, drainage systems, tunnels, subways, etc. all comprise such penetrations. However, also constructions formed on the basis of nautical engineering do comprise such conduits. One finds them on board of vessels and/or other offshore applications such as oil rigs.

These penetrations are seen as unwelcome necessities in such a construction. Pipes for, for instance, water distribution and water wastage systems, air-conditioning systems, hydraulic and pneumatic control, sprinklers etc but also for transport of gas, or oil, need to be extending throughout such a construction, even though this entails introducing weak spots in a separation of the compartments.

Such weak spots do not manifest themselves to a great extent in the mechanical strength of the construction but much more in the undesired transport of physical phenomena throughout the structure during the occasion of a fire which itself needs to be confined as long as possible to only one area. This is important not only to allow for control and extinguishing the fire, but also to provide time for people present in compartments near to the fire for reaching a safe distance from the fire before it further expands. To prevent smoke and/or fire from passing through the conduit from one compartment to another, the conduit is usually provided with a material that closes the conduit, at least for some time, when the conduit is exposed to heat due to a nearby fire.

Although above reference is made to a construction element having a conduit and dividing two compartments, it is also possible that a construction element separates a compartment from the surrounding environment. It is thus possible that one side of the construction element is exposed to atmospheric conditions.

It will be appreciated that a pipe extending through a conduit, the conduit itself and the construction element into which the conduit is incorporated, may each be made of a material that allows for the conduction of heat. The efficiency for conducting heat depends on the type of material and the dimensions of that material. In principle, heat can in such a situation be supplied to the inner space of the conduit via at least two different routes. The first route is via the pipe extending through the conduit and the second route to the inner space of the conduit is via the material out of which the conduit itself is made. As in offshore constructions and vessels, conduits are usually made of metal, i.e. a good heat-conducting material, heat is usually rapidly supplied to the inner space of the conduit via the second route. Of course, heat may also exclusively be applied to the inner space of the conduit via the first route, in a situation where the partition is for instance a concrete wall and the conduit is formed by a through-hole in that wall.

There is a strong tendency in both the offshore and the on-shore construction industry to make pipes, in particular pipes of so-called service systems as referred to above, of a plastic material such as for instance PVC. Relative to aluminium or metal pipes, such plastic pipes offer an enormous reduction in weight, clearly advantageous in shipbuilding. As known, plastics are not susceptible and do not contribute to corrosion, advantageous in both the offshore and on-shore construction industry. On exposure to heat however, such plastic pipes may weaken, i.e. become soft, and are therefore further in this specification referred to as made of a thermally weakenable or a thermally softenable material. The phrase thermally weakenable material refers thus in general to materials comprising or consisting of plastic. However, if it is envisagable that also pipes made of or made with fibreglass form thermally weakenable material.

It will be clear that such weakening of the pipe will occur more rapidly in a conduit which is made of metal and incorporated in a metal construction element or partition. The conduit will then act as a kind of oven surrounding the pipe of the weakenable material, leading to local collapse of the pipe. However, a heated inner wall of a through-hole in a stone or concrete wall which is exposed to a fire, may equally act like an oven, even though the heating-rate will in that case be different than the heating-rate for "the metal oven". A stone or concrete wall will absorb much more heat and is a poor conductor of heat. The second route for the supply of heat into the conduit is therefore much less effective. In such a situation it may well be that the first route, i.e. transport of heat into the conduit via the pipe itself, is the most dominant route.

It is common practice to seal the space between a conduit and a pipe as extending through the conduit, with a sealing system. Such a sealing system may provide sealing capacities before exposure to heat, and may for instance seal such that gas and/or water cannot penetrate through the annular space between the pipe and the conduit.

In particular for conduits through which a single pipe of a thermally weakenable material extends, advanced sealing systems have been developed. Reference is made to EP 120 075.9 B1 of the same inventor, describing so-called "crusher plugs". At each end of the conduit is a plug inserted in the annular space between the conduit and the pipe extending through the conduit. The crusher plug is made of a thermally expandable material. Upon exposure to heat, the crusher plug expands. However, as the conduit is of a very rigid material expansion is only possible radially inwards. As upon the exposure to heat the thermally weakenable pipe has started weakening, the radial inward expansion of the plug crushes the pipe further and therewith closes the pipe off as well as the complete conduit. The use of such plugs is very advantageous for conduits through which a single pipe extends, as the annular space which needs to be shut off by the plug is very well defined.

WO 2006/097290, also of the present inventor, discloses a conduit through which a plurality of pipes extend. For sealing that conduit a system is described which is to a certain extent suitable for placement in a conduit as described above. That system comprises a multitude of heat expandable rubbery sleeves. The sleeve material is made heat expandable by incorporation of heat expandable graphite into the rubbery material. Such a sleeve is also referred to as a filler sleeve. Usually, the sleeve is easily bendably, soft, and has relatively poor mechanical properties. This makes the sleeves perfect for inserting in a conduit and therewith filling the conduit. The sleeves are applied in a fashion parallel to each other and parallel to the pipe. The system further comprises a fire-resistant and/or watertight sealant for sealing off both ends of the conduit. The sealant is applied against the ends of the sleeves and forms a sealing layer that seals off the conduit.

A system as described in WO 2006/097290 is usually applied in a conduit which is very large in cross-section relative to the cross-section of the pipe extending through the conduit. The main reason for this is that there has to be enough space in the conduit for filling the conduit with the heat expandable rubber sleeves, so that these heat expandable sleeves are during expansion in radial (transverse) direction capable of closing the conduit fully off. As there is space between the filler sleeves as well as in each empty sleeve, thermal expansion can freely occur in the radial (transverse) direction as soon as the temperature in the conduit reaches a point from where the thermally expandable rubber material will expand.

Although there is in axial (longitudinal) direction per unit of length no space for expansion available between the sealant layers and the expansion is expected to be larger in axial direction than in radial direction given the amount of heat expandable material that is axially aligned, the expansion of the filler sleeves is initially still predominantly radially oriented.

Without wishing to be bound by any theory this is thought to be a result of three factors. Firstly, as soon as thermal expansion occurs, even though at low temperatures and therefore still only to a limited extent, the axially expanding sleeves feel constrained between the sealant layers and start buckling, therewith removing pressure on the inner wall of the sealant layers. Secondly, the expansion will find its way radially given the little resistance the expansion experiences on radially expanding. (Remember, space is available radially, not only due to the space in and between the sleeves, but at higher temperatures also due to the weakening pipe within the conduit). Thirdly, air originally trapped in the conduit and reaching a high pressure due to the raised temperature and volume reduction in the conduit, will at some stage find its way out, presumably through small cracks which have become available in the sealant layer without a breaking up of the sealant layer. This escaping of air offers "new volume" made available in the conduit, into which the expanding sleeve layers can expand, therewith staying within the confinement of the conduit and the sealant layers.

At some stage, the expanding forces in the conduit as restrained by the sealant layers become so high that the sealant layer breaks.

This breaking is then in itself not a problem as the expanded sleeves have sealed off the conduit before the sealant layer breaks.

Currently there is a strong desire to have smaller and shorter conduits, in order to save both weight and space, without compromising sealing capacity both before and during exposure to a fire.

Conduits which are smaller in cross-sectional dimensions do have little capacity for letting the onset of expansion of the filler sleeve material to predominantly take place in radial direction. In such conduits, it is the radial expansion which is constrained. Hence, the expansion will at a much earlier stage attempt to find its way axially, resulting in early breaking of the sealant layer, with a possibility that the sealant layer breaks before the conduit has been fully closed off by the expanding material. In such a situation it is needed to apply instead of a sealant layer a much stronger "structure". In response thereto one applies in practice a plug designed to sustain high pressures rather than a sealant layer. It turns out that a conduit with expandable filler sleeve in the annular gap between the conduit and the pipe extending therethrough, on both ends of the conduit closed off by a deeply inserted plug, effectively allows the filler sleeves to expand radially and close the conduit and pipe fully off.

However, the drive for further reduction of the cross-sectioned area of the conduit relative to the pipe continues in attempts to save even more space and even more weight.

When the annular gap between the conduit and the pipe becomes very small, a plug cannot be inserted and can thus not offer resistance against axial expansion of the filler sleeve material. The situation becomes even worse when the pipe is slightly off-centre relative to the conduit.

On the market is a system available that comprises relatively thin wrappable sheets of rubbery heat expandable material and two blocking devices, each of which is mountable in front of the conduit against the partition to provide resistance against axial expansion of the heat expandable material and to force the expansion to direct itself radially inward so as to close the conduit and the pipe fully off upon exposure to heat. Such a system has many drawbacks. First, it requires two extra mounting steps (one blocking device on each side of the partition) and facilities for mounting at parts of the partition "surrounding" the conduit. Secondly, the space saved in cross-sectional direction is to some extent lost due to the need to mount the blocking devices to the parts of the partition surrounding the conduit. Thirdly, the blocking devices itself requires space, so that in axial direction the conduit or the penetration effectively has become longer instead of shorter.

It is an object of the invention to provide a method for sealing an annular space between a rigid conduit and a pipe, tube or duct made of a thermally expanding material and extending through the conduit.

It is an object of the invention to provide a sealing system for sealing an annular space between a'rigid conduit and a pipe, tube or duct made of a thermally expanding material and extending through the conduit.

It is an object of the invention to provide a partition provided with a rigid conduit and pipe, tube or duct made of a thermally weakenable material and extending through the conduit.

SUMMARY OF THE INVENTION

Provided is a method for sealing an annular space between a rigid conduit and a pipe, tube or duct extending through the conduit and made of a thermally weakenable material. The method comprises of applying in the conduit a layer of a thermally expandable material concentrically around the pipe, tube or duct. The method further comprises applying at each end of the conduit between the conduit and the pipe, tube or duct a sealant which is made of a fire-resistant polymer. This sealant is further vulcanizable at room temperature under exposure to humidity. The sealant is of a thermally substantially shape retaining and size retaining type. The sealant is such that after vulcanization the sealant has a hardness within a range of 45-60° shore A.

It has turned out that the sealant layer is capable of acting as a well-fitted plug which can sustain high axial pressure exerted by the axially expanding layer of thermally expandable material, such that the axial expansion becomes blocked and is "redirected" into a radial inward expansion which results in full closure of the conduit and the thermally weakened plastic pipe.

Figure 2:
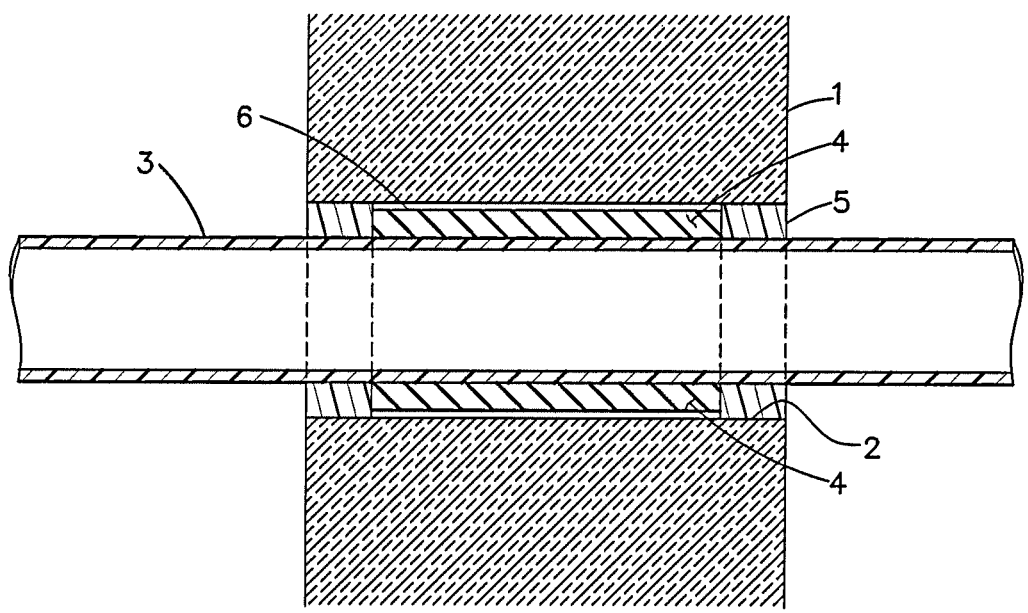
Figure 3:
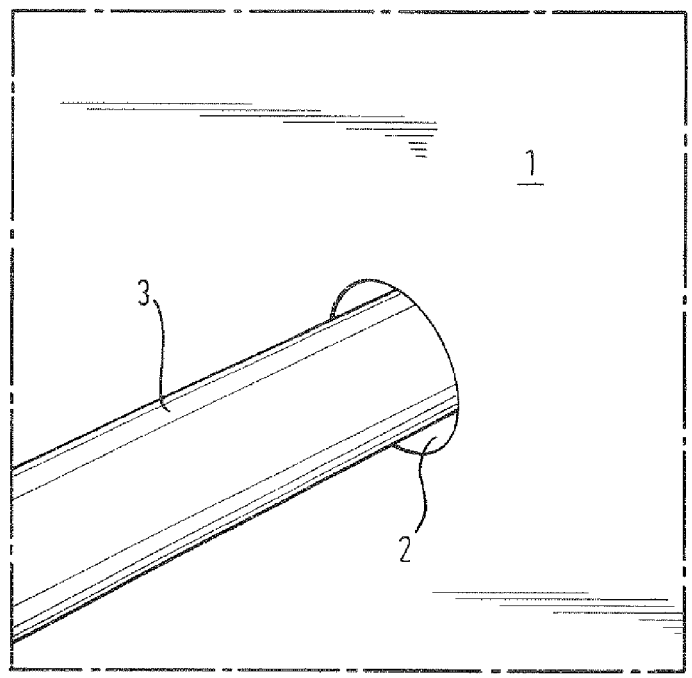
Figure 4:
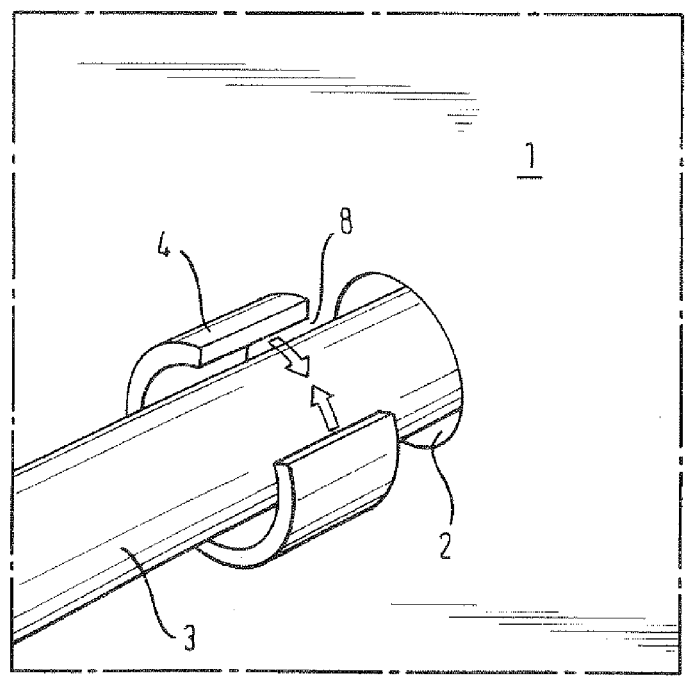
Figure 5:
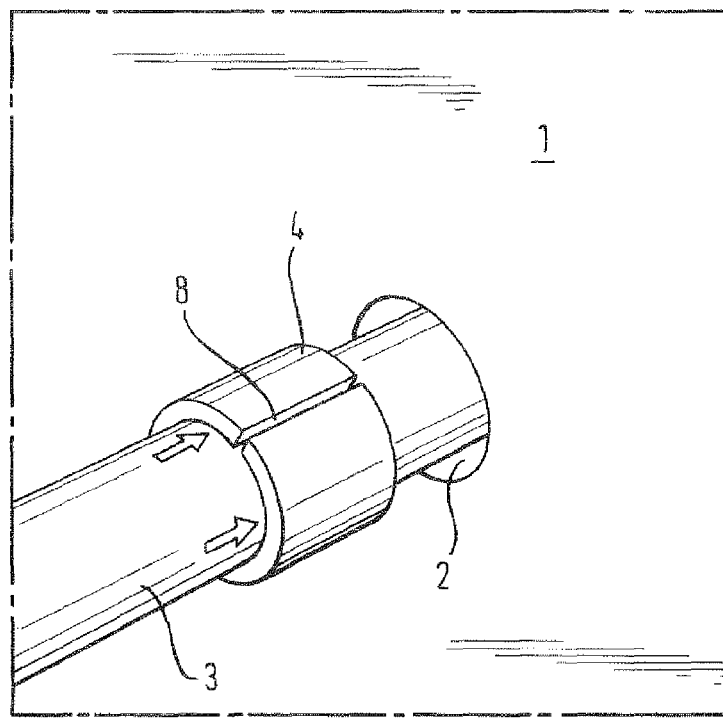
Figure 6:
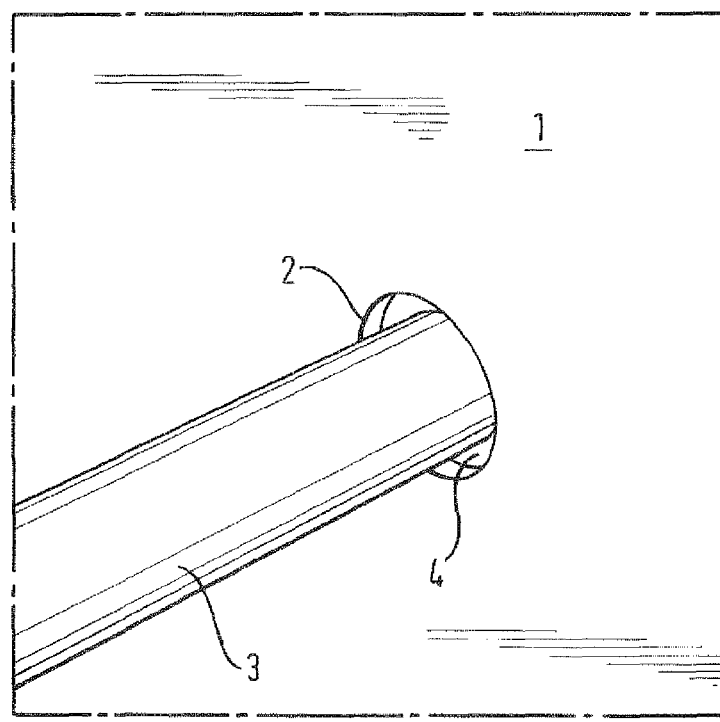
Figure 7:
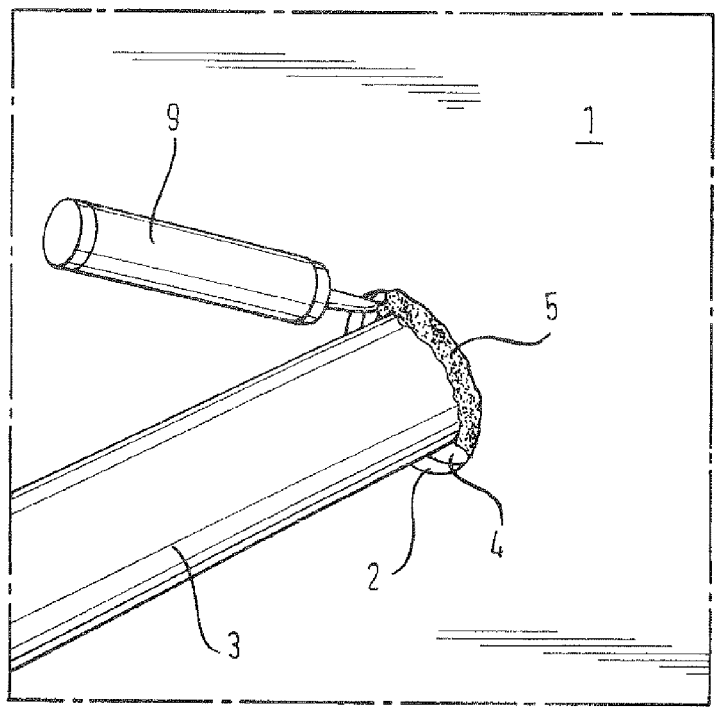
Figure 8:
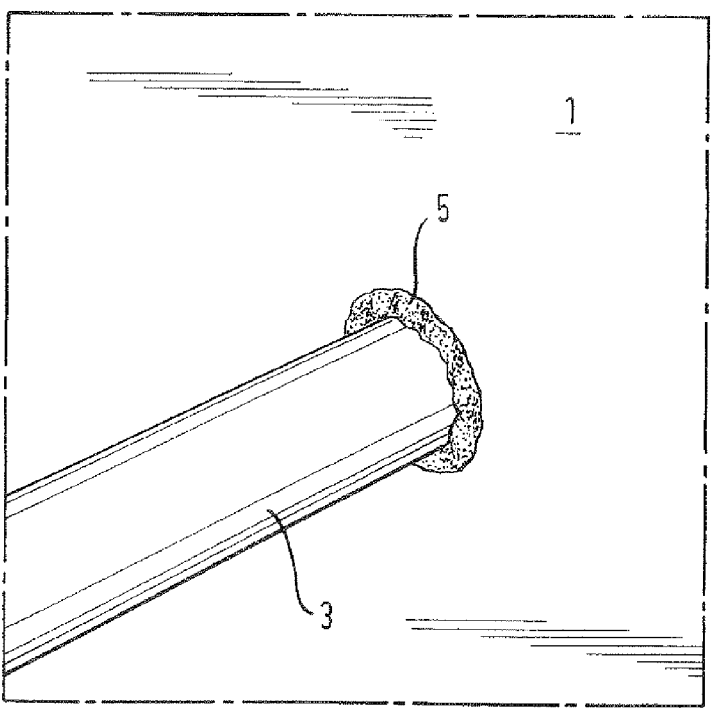
Figure 9:
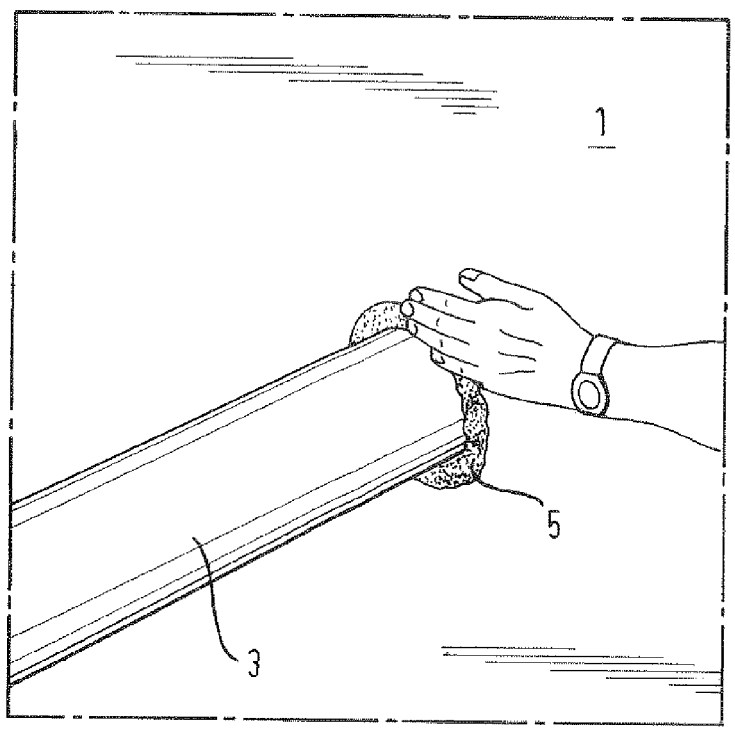
Figure 10:
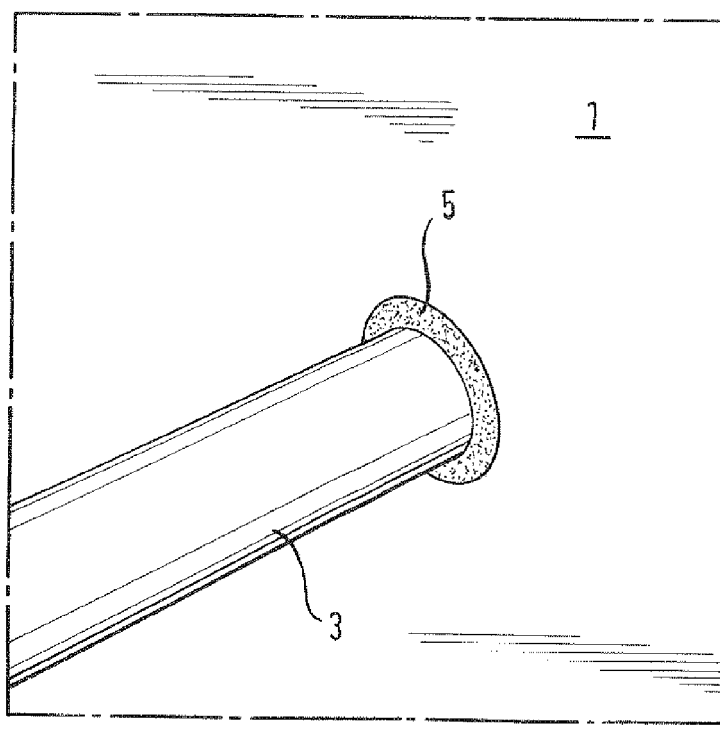
Figure 11:
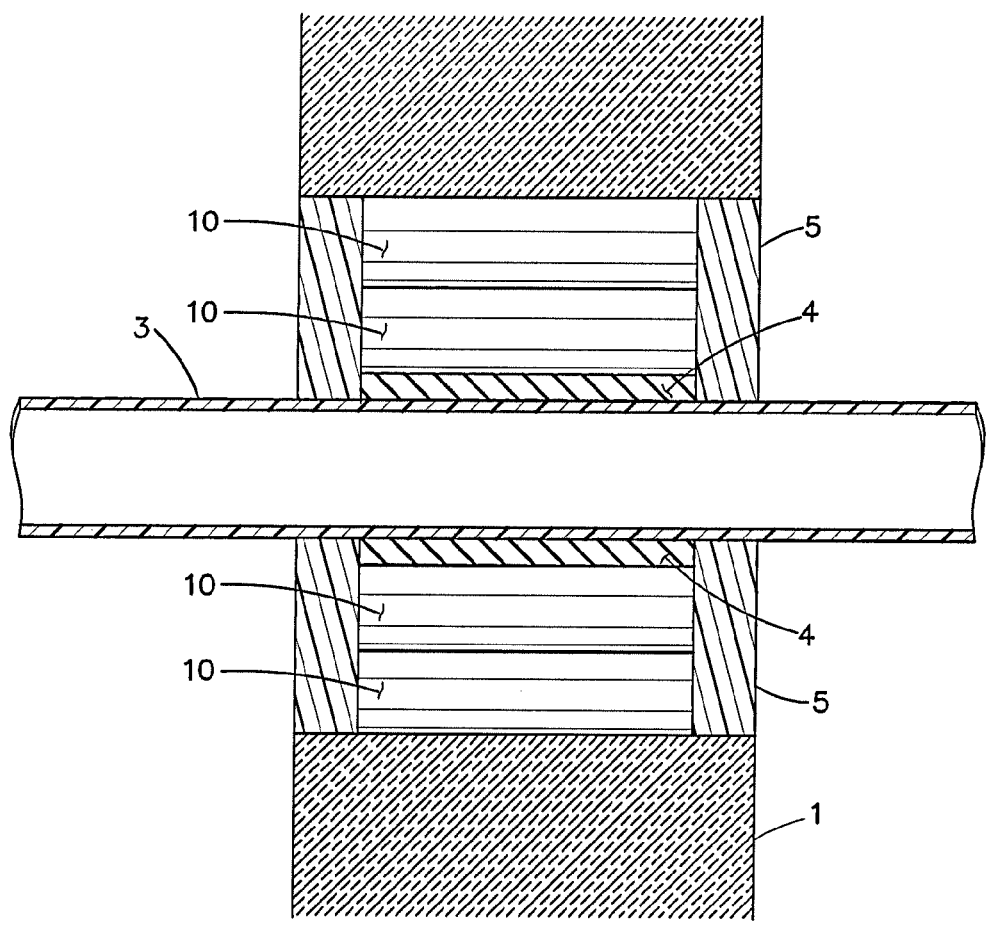
Figure 12:
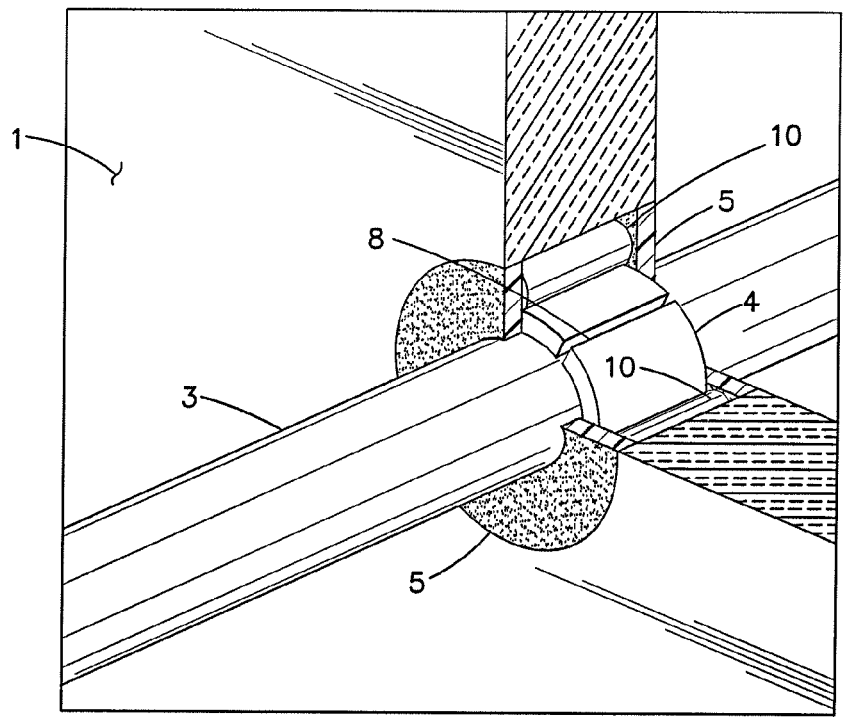
Figure 13:
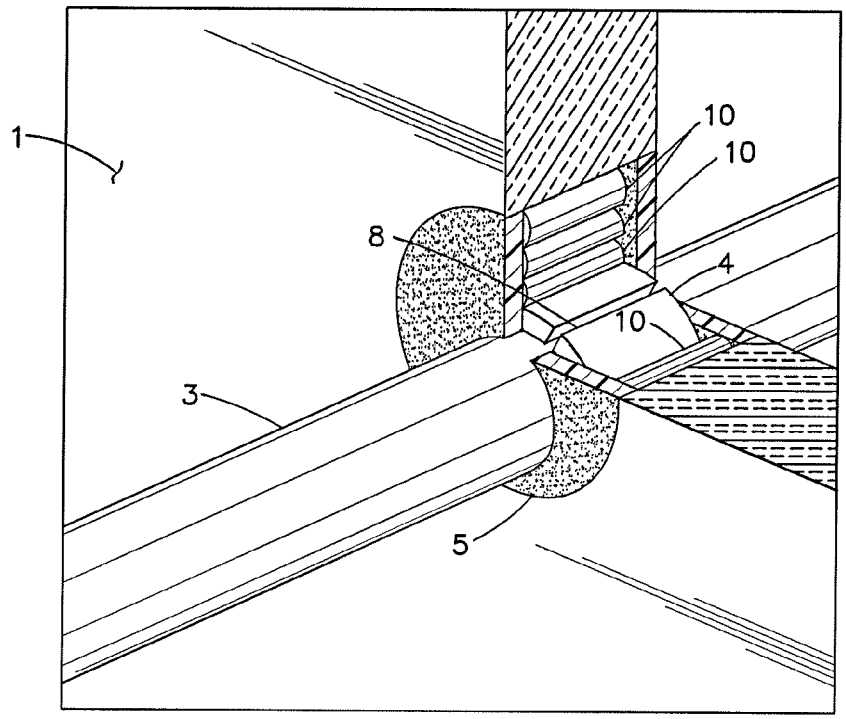

The invention, further embodiments thereof and related advantages are further described and explained in combination with the exemplary drawings which show in FIG. 1 schematically and in cross section a first embodiment of a sealing system and a partition in accordance with the invention;

FIG. 2 schematically and in cross section a second embodiment of a sealing system and a partition in accordance with the invention;

FIG. 3 first step of an embodiment of a method according to the invention;

FIG. 4 a second step of an embodiment of a method according to the invention;

FIG. 5 a third step of an embodiment of a method according to the invention;

FIG. 6 a result of the third step as shown in FIG. 5;

FIG. 7 a fourth step of an embodiment of a method according to the invention;

FIG. 8 a result of the fourth step as shown in FIG. 7;

FIG. 9 a fifth step of an embodiment of a method according to the invention;

FIG. 10 a result of the fifth step as shown in FIG. 9;

FIG. 11 schematically and in cross section a third embodiment of a sealing system and a partition according to the invention;

FIG. 12 schematically in a semi-exploded view a fourth embodiment of a sealing system and a partition according to the invention;

FIG. 13 a fifth embodiment of a sealing system and a partition in accordance with the invention.

In the drawing like parts have like references.

FIG. 1 shows in cross section a partition 1 provided with a rigid conduit 2. Through the conduit 2 extends a pipe, tube or duct 3 made of a thermally weakenable material. Plastic may be such a weakenable material. Such a material usually becomes soft when exposed to a temperature of about 75° C. or higher. Combustion may occur when exposed to a temperature of about 140° C.

The conduit 2 may further comprise a layer 4 of a thermally expandable material concentrically applied in the conduit 2 around the pipe, tube or duct 3. At each end of the conduit 2 is a sealant 5 applied between an inner wall of the conduit 2 and the pipe, tube or duct 3. The sealant 5 is made of a fire-resistant polymer.

The sealant is vulcanizable at room temperature and exposure to humidity. Such sealants are commercially available. The sealant is further of a thermally substantially shape-retaining and size-retaining type and such that after vulcanization the sealant has a hardness within the range of 45-60° Shore A. Such a sealant can be based on silicon, and is commercially available, for instance as a putty which is sold under the Trade name NOFIRNO. The sealant is free from expandable graphite.

As shown, the conduit may comprise an annular air gap 6 in the conduit 2. This air gap 6 may indeed be between the layer 4 and the conduit 2. However, alternatively, or additionally, the air gap 6 may also be between the pipe, tube or duct 3 and the layer 4. It has turned out that air trapped in the conduit shortens the time needed for expansion of the thermally expandable layer such that the weakened pipe, tube or duct is "crushed" and the conduit is fully closed off.

As shown, it is likely that at one side of the partition insulation material 7 is applied. Normally, this material will be applied at the side of the partition which is expected to be directly exposed to fire or heat. The insulation material applied in a situation where the partition and conduit are each made of a metal or a metal alloy, is normally based on mineral wool.

The diameter of the conduit 2 is relatively small to the diameter of the pipe, tube or duct 3. Preferably, the outer diameter of the pipe, tube or duct 3 is more than 50% of the inner diameter of the conduit 2. Even more preferable is that the outer diameter of the pipe, tube or duct is more than 60% of the inner diameter of the conduit 2. A further optimization is achieved when the outer diameter of the pipe, tube or duct 3 is more than 70% of the inner diameter of the conduit 2. Of course, the larger the outer diameter of the pipe, tube or duct 3 relative to the inner diameter of the conduit, the more space is saved. The partition shown in FIG. 1 may be of a metal alloy, typically steel aluminium or a copper alloy. However, as shown in FIG. 2, the partition 1 itself may comprise a stone or concrete wall. In that case the conduit 2 will comprise a through hole in that stone or concrete wall. When the partition is a stone or concrete wall, normally no insulation material is applied on any side of the partition 1.

When the conduit 2 is of a metal alloy, the conduit 2 can have a length of about 18 cm. When the conduit is based on a through hole in a partition of stone or concrete, the conduit 2 may have a length as short as about 15 cm. The system for sealing is essentially the same for each type of conduit, metal or stone/concrete. Dimensions of conduit and consequently of the layer 4 may differ though.

The layer of a thermally expandable material 4 may be a single layer. The thermally expandable material 4 may be a rubbery material comprising heat expandable graphites. Such a material is a non-intumescent material.

The sealant 5 may be made of a fire-resistant polymer and of a thermally substantially shape-retaining and size-retaining type preferably comprises polymer which is free from components which would on heating cause the polymer to expand to an extent larger than the extent to which the polymer itself expands on such heating. Preferably, the polymer comprises a silicon based polymer. Ideally, the sealant is non-ignitable at a temperature of 400° C. It is further advantageous for the application when the sealant has an oxygen index of 45% or higher as determined by the well-known internationally recognized way of measuring the oxygen index.

Turning now to FIGS. 3-10, a method is disclosed for sealing an annular space between a rigid conduit 2 and a pipe, tube or duct 3 extending through that conduit 2. Depicted is a conduit 2 in a partition 1 of stone or concrete, but if the partition and conduit were made of a metal of metal alloy, the method would essentially be the same. As before, the pipe, tube or duct is made of a thermally weakenable material. As a first step, as shown in FIG. 3, provided is a partition having a conduit 2 with extending therethrough a pipe, tube or duct 3 made of a thermally weakenable material. As shown in FIG. 4, a second step comprises applying a thermally expandable material concentrically around the pipe, tube or duct 3. The thermally expandable material may be provided in a sleeve, or as a sleeve, as shown in FIG. 4 having a slit 8 for conveniently manipulating the sleeve around the pipe, tube or duct 3. As schematically shown in FIG. 5 once the sleeve has been manipulated around the pipe, tube or duct 3 it is as an example of a third step pushed fittingly in the conduit 2. Preferably, this sleeve ends up in the middle of the conduit, still at each end of the conduit allowing for space which can be occupied by the sealant 5, so that the sealant 5 will be in the conduit and flush with the partition 1. FIG. 6 shows the end result of applying the thermally expandable material concentrically around the pipe, tube or duct 3.

As shown in FIG. 7, the sealants may in a fourth step be applied at one (or each) end of the conduit 2 between the conduit 2 and the pipe, tube or duct 3. As discussed before, this sealant is made of a fire-resistant polymer and is vulcanizable at room temperature under exposure to humidity. The sealant is further of a thermally substantially shape-retaining and size-retaining type and such that after vulcanization the sealant has a hardness within a range of 45-60 Shore A. Application of the sealant can, for instance, take place with the aid of a sealant dispenser 9. The sealant may be applied in a very generous way (as shown in FIG. 8), so that the sealant 5 can be further pressed into the conduit (as a fifth step), for instance, as shown in FIG. 9, or, as not shown, with the aid of a tool or a humid cloth. Also when the sealant is pressed in manually, it is recommendable that the hands are made wet with for instance water so that the sealant does not stick to the hand of the worker. Finally, sealant 5 will be flush with, in this case, the partition 1 and the partition 1 with the conduit 2 having installed in it the sealing system as disclosed in this specification, will look from one side of the partition 1 as shown in FIG. 10. In case the conduit is made of steel or a metal (alloy) the sealant will be flush with each rim of the conduit.

As indicated above, the system as described for use in a conduit which is a through hole in a concrete or stone wall and a system for use in a conduit which is made of metal or a metal alloy as part of a partition which is also made of a metal or metal alloy, is essentially the same. Importantly, the routes available for transfer of heat into the conduit and in particular to the layer of thermally expandable material differs between these two types of conduit. The conduit which is part of a metal or metal alloy partition and which is made of metal or a metal alloy itself allows for transfer of heat into the conduit via the material of the partition and the material of the conduit as well as via the pipe, tube or duct extending from the heat exposed side into the conduit. In other words, in this case two routes are available. On the other hand, the conduit which comprises a through hole in a stone or concrete partition has only one route for transfer of heat into the conduit available which is the route offered by the pipe, tube or duct itself. A concrete or stone partition, will first absorb heat which will take a long time, before it will start transferring that heat into the conduit. By the time transfer of heat from the concrete or stone wall itself into the conduit takes place, the pipe, tube or duct of thermally weakenable material will already have weakened to a large extent.

Interestingly, it has turned out that the sealing system as described above is applicable for each of these types of conduit. Of course, when the conduit is made of a metal or metal alloy and part of a metal or metal alloy partition, heat will very rapidly enter the conduit and the thermally expandable material will respond rapidly. However, disadvantageously, the use of a steel or metal conduit is always vulnerable to corrosion.

It thus turns out that the sealing system as described above does also respond fast enough when the conduit is a through hole in a concrete or stone wall. During exposure to heat it is in this situation possible that the sealing system, i.e. the sealant layer, opens somewhat up at the side exposed to heat due to a nearby fire. This opening may be caused by an initial softening of the thermally weakenable pipe, tube or duct. However, as a result of this the heated air may axially enter the conduit and raise the temperature within the conduit. The mechanical blocking function of the sealant layer remains intact. As soon as the thermally expanding layers start expanding, the sealant layer will (re) direct the expansion radially, closing the by then weakened pipe, tube or duct. Upon further expansion, the complete conduit will be blocked off by the expanding rubbery material of the thermally expanding material layer 4.

During exposure for two hours to a nearby fire, no changes were visible at the side opposite the side exposed to the nearby fire, also no smoke escaped from that unexposed side.

A further advantage of the system according to the invention is, as following from above, that one system is provided for different types of conduit. These conduits may differ in the sense that the available routes for heat transfer into the conduit are different.

It has been indicated above that the actual length of the conduit may differ for the different types of conduit. In general, the length of a conduit which comprises a through hole in a stone or concrete wall can be as short as about 15 cm. The length of a conduit as used in a steel construction as for instance in the offshore and shipbuilding industry, can be as short as about 18 cm. Given the availability of differently sized pipes, tubes or ducts, i.e. different in the sense of their outer diameter, and the availability of differently sized conduits, in this case different inner diameters, the layers of thermally expandable material can be provided as single layered sleeves, having a slit substantially extending in an axial direction, and dimensions according to one of the possibilities as described in Table 1. From this table it is possible to work out the dimensions of the air gap 6, or in general the volume available for expansion of the thermally expandable layer 4. Clearly, the length of the layer cannot be too short. After all, there has to be enough thermally expandable material to "crush" the pipe, tube or duct, and to close off the conduit. The thermally expandable material is commercially available under the trade name RISE. Expansion upon exposure to heat may be in a range between 5 to 40 times its original volume.

| Outer diameter of pipe, tube or duct (mm) | OD/ID Of sleeve (mm) | Length of sleeve (mm) | Inner diameter of conduit (mm) |
| --- | --- | --- | --- |
| 16 | 27/16 | 110-140-160-210 | 30 |
| 20 | 35/20 | 110-140-160-210 | 40 |
| 25 | 35/25 | 110-140-160-210 | 40 |
| 32 | 46/32 | 110-140-160-210 | 50 |
| 40 | 52/40 | 110-140-160-210 | 55 |
| 48 | 58/48 | 110-140-160-210 | 60 |
| 50 | 64/50 | 110-140-160-210 | 65 |
| 60 | 76/60 | 110-140-160-210 | 80 |
| 63 | 76/63 | 110-140-160-210 | 80 |
| 75 | 95/75 | 110-140-160-210 | 100 |
| 90 | 115/90 | 110-140-160-210 | 125 |
| 110 | 140/110 | 110-140-160-210 | 150 |

FIG. 11 shows a cross section of usage of a third embodiment of a system and a partition in accordance with the invention. The system further comprises a number of rubber elements, each made of a fire-resistant vulcanized rubber of a thermally substantially non-expandable type. In this example, the conduit 2 comprises a support structure which is formed between the inner wall of the conduit 2 and the pipe, tube or duct 3. The support structure comprises at least one of the rubber elements 10 made of a fire-resistant vulcanized rubber of a thermally substantially non-expandable type. Rubber of the thermally substantially non-expandable type comprises rubber which is free from components which would on heating cause the rubber to expand to an extent larger than the extent to which a rubber itself expands on such heating. Such rubber elements 10 are preferably tubular elements. The rubber has preferably a hardness in the range of 70-78 Shore A, preferably about 74 Shore A. The rubber element 10 comprises a mantle wall which is preferably closed in itself. The mantle wall has a thickness in the range of about 2-5 mm, preferably 3-4 mm. Such an element 10 is itself relatively rigid. As such, it fills up at least a part of a conduit having a relatively large inner diameter and through which a pipe, tube or duct with a relatively small outer diameter extends. It remains still possible to apply a single layer of the thermally expandable material 4, as in practice, on exposure to heat, such rigid rubber tubular elements 10 will direct the thermal expansion of thermally expandable layer 4 radially inwards. The support structure formed by the rigid rubber element 10 is further capable of providing support to the sealant layers 5.

FIG. 12 shows in a semi-exploded view a fourth embodiment of such a system whilst FIG. 13 shows also in a semi-exploded view a fifth embodiment of such a system. The difference between FIG. 12 and FIG. 13 is that the pipe in FIG. 12 extends concentrically with the conduit through the conduit, while in FIG. 13 the pipe is off-axis extending through the conduit.

Finally, it is pointed out that such a rubber rigid element of fire resistant vulcanized rubber as used for the support structure shown in FIG. 11-13, can also be provided with an axial slit (not shown) and concentrically applied around the pipe, tube or duct just outside the conduit 2 against the sealant layer 5 (not shown). In particular in a situation as shown in FIG. 11-13 this may provide additional support to the sealant layer 5 against axial expansion of the thermally expandable layer 4.

The invention is not limited to the examples described hereinabove. Although the thermally expandable layer 4 is used for sealing an annular gap, as follows from in particular FIG. 11-13, it is not necessarily the case that the conduit 2 itself is cylindrical. The conduit 2 may for instance have a rectangular cross section. In such a case, it is possible that the rubber elements 10 made of fire-resistant vulcanized rubber of a thermally substantially nonexpendable type are placed in the conduit 2 such that effectively a substantially annular gap is formed between the pipe, tube or duct 3 and these rubber elements 10. The layer of the thermally expandable material 4 can then concentrically be applied around the pipe 3. In practice it may be more advantageous to first apply the thermally expandable material concentrically around the pipe, for instance by manipulating a sleeve of that material around the pipe, and then secondly, to fill remaining space in the conduit 2 up with the rubber elements 10. Thirdly, the sealant 5 can be applied.

Whilst the sleeves of the thermally expandable material are likely to be made via an extrusion process, the rubber elements 10 are preferably made via a molding step.

Although, ideally for both safety and economical reasons the sealant layer 5 has a thickness of about 2 cm, it is possible to apply for safety reasons a much thicker sealant layer 5, say about 3 cm, and for more economical reasons a thinner sealant layer, say down to about 1 cm. Routine experimenting and basic engineering considerations will put a skilled person in a position to apply the system with dimensions different from those disclosed hereinabove.

All such variants and modifications are understood to within the scope of the invention, as defined by the attached claims.

The invention claimed is:

1. A method for sealing an annular space in a rigid conduit and a pipe, tube or duct extending through the conduit, the conduit being made of metal, metal alloy, stone or concrete and the pipe, tube or duct being made of a thermally weakenable plastic material, wherein the outer diameter of the pipe, tube or duct is equal to or more than 50% of the inner diameter of the conduit, wherein the method comprises applying in the conduit a layer of a thermally expandable rubbery material comprising heat expandable graphite concentrically around the pipe, tube or duct, and applying at each end of the conduit between the conduit and the pipe, tube or duct a sealant being made of a fire resistant polymer;
   the sealant being vulcanizable at room temperature under exposure to humidity;
   the sealant comprising polymer which is free from components which would on heating cause the polymer to expand to an extent larger than the extent to which the polymer itself expands on such heating so as to thereby be thermally substantially shape-retaining and size-retaining; and
   the sealant, after vulcanization, has a hardness within a range of 45-60 shore A.

2. The method of claim 1, wherein the method comprises forming an annular air gap in the conduit.

3. The method of claim 2, wherein the air gap is between the layer and the conduit.

4. The method of claim 2, wherein the air gap is between the pipe, tube or duct and the layer.

5. The method of claim 1, wherein the outer diameter of the pipe, tube or duct is more than 60% of the inner diameter of the conduit.

6. The method of claim 1, wherein the sealant is applied in a thickness in a range of 10-30 mm.

7. The method of claim 1, wherein the conduit has a length of about 18 cm when the conduit is of a metal or metal alloy, and a length of about 15 cm when the conduit is of stone or concrete.

8. The method of claim 1, wherein the layer of a thermally expandable material is a single layer.

9. The method of claim 1, wherein the polymer comprises silicon based polymer.

10. The method of claim 1, wherein the sealant is non-ignitable at a temperature of 400° C.

11. The method of claim 1, wherein the sealant has an oxygen index of 45% or higher.

12. A partition provided with a rigid conduit, the conduit made of metal, metal alloy, stone or concrete and a pipe, tube or duct made of a thermally weakenable plastic material as extending through the conduit, wherein the outer diameter of the pipe, tube or duct is equal to or more than 50% of the inner diameter of the conduit, wherein the partition further comprises a layer of a thermally expandable rubbery material comprising heat expandable graphite concentrically applied in the conduit around the pipe, tube or duct, wherein at each end of the conduit a sealant made of a fire resistant polymer is applied between the conduit and the pipe, tube or duct;
   wherein:
      the sealant is vulcanizable at room temperature under exposure to humidity;
      the sealant comprises polymer which is free from components which would on heating cause the polymer to expand to an extent larger than the extent to which the polymer itself expands on such heating so as to thereby be thermally substantially shape-retaining and size-retaining; and
      the sealant, after vulcanization, has a hardness within a range of 45-60 shore A.

13. The partition of claim 12, wherein the partition comprises an annular air gap in the conduit.

14. The partition of claim 13, wherein the air gap is between the layer and the conduit.

15. The partition of claim 13, wherein the air gap is between the pipe, tube or duct and the layer.

16. The partition of claim 12, wherein the outer diameter of the pipe, tube or duct is more than 60% of the inner diameter of the conduit.

17. The partition of claim 12, wherein the sealant is applied in a thickness in a range of 10-30 mm.

18. The partition of claim 12, wherein the conduit has a length of about 18 cm when the conduit is of a metal alloy, and a length of about 15 cm when the conduit is of stone or concrete.

19. The partition of claim 12, wherein the layer of a thermally expandable material is a single layer.

20. The partition of claim 12, wherein the polymer comprises silicon based polymer.

21. The partition of claim 12, wherein the sealant is non-ignitable at a temperature of 400° C.

22. The partition of claim 12, wherein the sealant has an oxygen index of 45% or higher.

23. The partition according to claim 12, wherein the partition and the conduit are each made of a metal or a metal alloy.

24. The partition according to claim 12, wherein the partition comprises a stone or concrete wall and the conduit comprises a through-hole in that stone or concrete wall.

* * * * *